June 5, 1923.
R. H. JEFFERIES
1,457,370
MOLDING SUBSTANCE FOR DENTAL AND OTHER USES AND PROCESS FOR MAKING SAME
Filed April 21, 1921
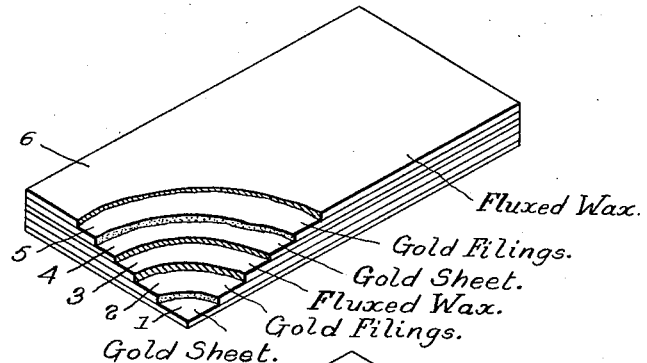
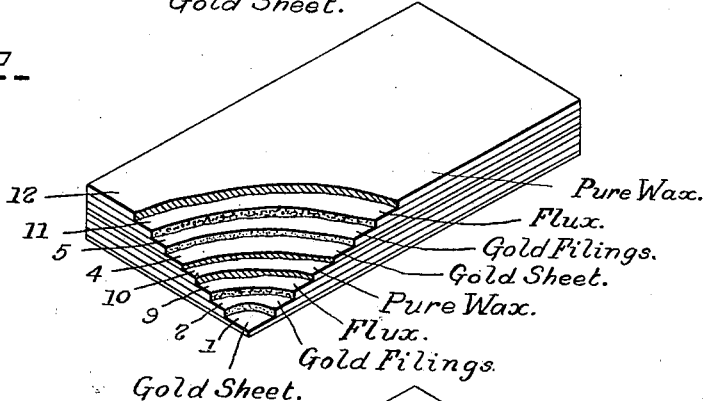
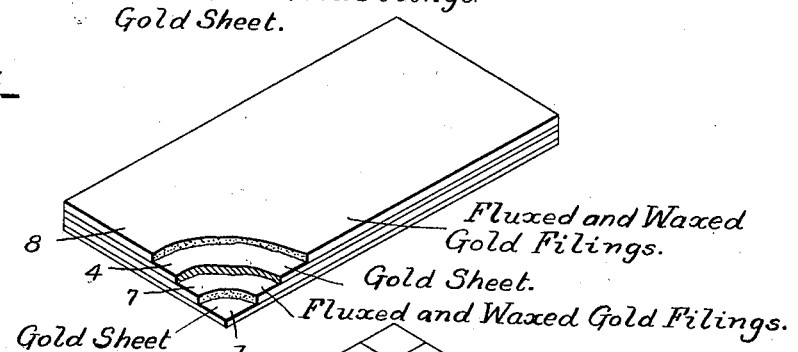
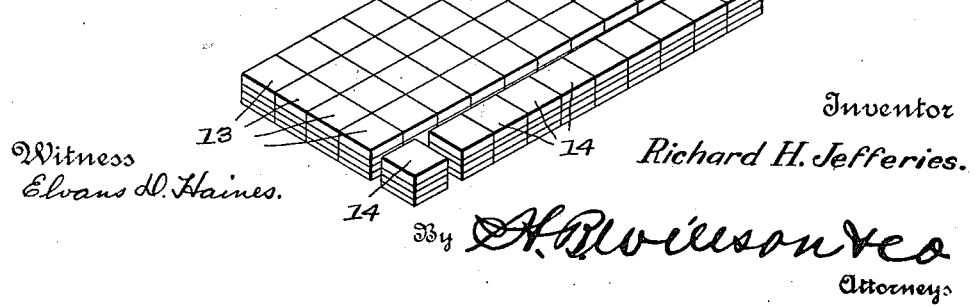
Witness
Evans D. Haines.
Inventor
Richard H. Jefferies.
By H. B. Willson & Co.
Attorneys Patented June 5, 1923.

1,457,370

UNITED STATES PATENT OFFICE.

RICHARD H. JEFFERIES, OF RICHMOND, VIRGINIA.

MOLDING SUBSTANCE FOR DENTAL AND OTHER USES AND PROCESS FOR MAKING SAME.

Application filed April 21, 1921. Serial No. 463,332.

*To all whom it may concern:*

Be it known that I, RICHARD H. JEFFERIES, a citizen of the United States, residing at Richmond, in the county of Henrico and State of Virginia, have invented certain new and useful Improvements in Molding Substance for Dental and Other Uses and Processes for Making Same; and I do declare the following to be a full, clear, and exact description of the invention, such as will enable others skilled in the art to which it appertains to make and use the same.

This invention relates to an improved form of molding material or substance capable of being used for many purposes, but designed especially for use in the dental profession, and it also relates to the process for making the improved material or substance.

The principal object of the invention is to provide a material, substance, or composition containing gold or any other appropriate metal and being in such form that it can be easily and readily manipulated and pressed into any desired shape. Hence, the material or substance can be used to advantage in the dental profession in crown and bridge-work, making inlays and backing facings for crowns and the like. It may also be used to advantage in making and repairing jewelry.

The improved material or substance comprises a supporting base of the desired metal and a layer of a mixture of small particles or filings of a metal of a lower melting point than the base metal, a suitable flux and wax. The wax is intermingled with the metal particles or filings and the flux and holds these substances to the metal base and in such a state that the entire material or substance can be easily and readily manipulated or pressed into any desired shape.

The improved material or substance has the further advantage of being in a very unique and convenient form for the market.

As the invention may be used for innumerable purposes, it of course is to be understood that the invention is not limited to any one particular purpose.

The invention consists of the novel features of construction, the combination and arrangement of parts, and the various steps in the process of making it, as are hereinafter fully described and claimed, reference being had to the accompanying drawing, which forms a part of this specification, and in which similar reference characters are used to designate corresponding parts throughout the several views.

In these drawings:

Figure 1 is a perspective view, partly broken away and in section, illustrating one manner in which the various materials may be assembled together in forming the improved material or substance;

Figure 2 is a similar view illustrating another way in which materials may be assembled together in making the improved material or substance;

Figure 3 is a similar view illustrating the form which the materials shown in Figs. 1 and 2 will take upon the application of heat; and Figure 4 is a perspective view illustrating the manner in which the improved material or substance is cut up to adapt it for use.

The improved molding material or substance consists of a base, supporting member, or plate of any appropriate metal. When the substance is to be used in the dental profession, this base preferably consists of a sheet of gold. The sheet of gold may be of the type commonly known as mat, fibre or crystal gold. Upon this base, there is carried a layer comprising a mixture of small particles or filings of a metal of a lower melting point than the metal of the base, flux and wax. When the base is gold, then the just mentioned particles or filings are of gold solder, which has a lower melting point than the gold of the base.

The material or substance may be made in several ways. One way of making it, is to place a flat sheet of gold or the desired metal upon a flat support and to spread upon this sheet 1, a layer of gold solder filings 2 and then a layer 3 of fluxed wax, that is, a mixture of white bees wax and a suitable flux such as borax. Then, if desired, another layer of sheet gold 4 may be placed upon the layer 3 of fluxed wax, and upon this layer 4 another layer of gold solder filings 5 may be placed and upon which another layer of fluxed wax 6 may be placed. The structure may then be built up to any thickness desired.

After this has been done, the whole mass should be heated just enough to cause the wax to flow and unite the flux and gold solder filings to the plates 1 and 4. The material or substance will then partake of the appearance shown in Fig. 3, in which the numerals 1 and 4 represent the gold plates and 7 and 8 represent the layers adjacent to the plates 1 and 4, which layers consist of a mixture of the wax, filings and flux.

Another way of making the improved material or substance is to place upon a gold plate 1, a layer 2 of gold solder filings and then upon this a layer 9 of flux such as borax and then upon the layer 9, a layer 10 of white bees wax. From this point, the structure may be built up by another plate 4 of gold, another layer 5 of gold solder filings, another layer 11 of the flux, and another layer 12 of white bees wax. Then, if desired, more layers of the same materials may be applied.

When this structure, built up as shown in Fig. 2, is heated just enough to cause the wax to melt and run, the wax, flux and gold solder filings will become adhered to the plates 1 and 4, and the material will then take the construction shown in Fig. 3.

After the material or substance has been made so that it is in the form shown in Fig. 3, it may be cut into strips 13 as shown in Fig. 4, and then the strips 13 may be cut into small blocks or particles 14 of the desired size as they are used.

In using the material or substance, the blocks 14 of the desired size are first placed on the form or model for the molding, and then by the use of a hot spatula, the material may be molded, manipulated or pressed into the desired shape. After the material or substance has been pressed into the desired shape, the whole mass should be placed over a slow flame so that the wax will be burned out. Then after the wax has been burned out, the heat applied to the mass should be increased to such a temperature, that the filings will be melted, thus forming a molded article of the desired shape.

From the foregoing, it will be seen that the present invention makes an advance in the art of forming molded objects, and particularly in the dental profession, as numerous objects may be made without first taking an impression. The improved substance or material is of such consistency that it may be readily manipulated or worked into the desired shape much on the same order that clay can. In addition to this advantage, the substance or material carries the flux and the solder at such points that these substances will perform their purposes in a very efficient and effective manner.

From the foregoing description, taken in connection with the accompanying drawings, the construction and the use of the invention will be readily understood without a further explanation.

As various changes in form, proportion, in the details of construction and in the process may be resorted to without departing from the spirit and principle of the invention, it is to be understood that such may be done within the scope of the appended claims.

I claim:

1. A substance of the class described comprising a metallic base, and a layer carried by said base and consisting of a mixture of fluxed wax and solder.

2. A substance of the class described comprising a metallic base, and a layer carried by said base and consisting of a mixture of fluxed wax and small particles of solder.

3. A substance of the class described comprising a metallic base and a layer carried by said base and consisting of a mixture of fluxed wax and small particles of a metal similar to the metal of the base and of a lower melting point than the metal of the base.

4. A substance of the class described comprising a gold plate, and a layer carried by said plate and consisting of a mixture of fluxed wax and small particles of gold solder of a lower melting point than the gold of said plate.

5. The herein described process of forming a molding material or substance, consisting in placing upon a metal base plate, layers of flux, wax and small particles of a metal of a lower melting point than the metal of said base plate, and then raising the temperature of the whole mass sufficient to melt the wax and cause it and the flux and said particles to adhere to said base plate.

6. The herein described process of making a molding material or substance consisting in first placing upon a metallic base plate, a layer of small particles of a metal of a lower melting point than the metal of said base plate, then placing upon said layer of small particles a layer of fluxed wax, and finally raising the whole mass to a temperature sufficient to melt the wax and cause it and the flux and said particles to become adhered to said base plate.

7. The herein described process of making a molding material or substance, consisting in first placing upon a metallic base plate, a layer of small particles of a substance of a lower melting point than the metal of said base plate, then placing upon this layer a layer of flux, then placing upon the layer of flux a layer of pure wax, and finally raising the whole mass to a temperature sufficient to melt the wax and cause it and the flux and the particles of metal to become adhered to said base plate.

8. The herein described method of manipulating a molding substance consisting of a metallic base and a layer carried by the base and consisting of a mixture of wax, flux and small particles of metal of a lower melting point than the metal of said base, consisting in first cutting up the substance into blocks of a convenient size, then placing the blocks one by one upon a mold or form, then pressing them into the desired shape by the use of a hot spatula, then raising the temperature of the mass until the wax is burned out, and then finally raising the temperature of the mass still further until the aforesaid small particles of metal become melted and united with the metal of the base.

In testimony whereof I have hereunto set my hand.

RICHARD H. JEFFERIES.